US012673642B2

(12) United States Patent
Saez Ardiles

(10) Patent No.: US 12,673,642 B2
(45) Date of Patent: Jul. 7, 2026

(54) EFFORTLESS READJUSTABLE BRAKING SYSTEM

(71) Applicant: Independent Driving Systems, Inc., Houston, TX (US)

(72) Inventor: Julio Rodrigo Saez Ardiles, Houston, TX (US)

( * ) Notice: Subject to any disclaimer, the term of this patent is extended or adjusted under 35 U.S.C. 154(b) by 19 days.

(21) Appl. No.: 18/768,754

(22) Filed: Jul. 10, 2024

(65) Prior Publication Data

US 2025/0018903 A1     Jan. 16, 2025

Related U.S. Application Data

(60) Provisional application No. 63/512,742, filed on Jul. 10, 2023.

(51) Int. Cl.
| | |
|---|---|
| B60T 7/04 | (2006.01) |
| B60T 7/06 | (2006.01) |
| B60T 7/08 | (2006.01) |

(52) U.S. Cl.
CPC ................ B60T 7/042 (2013.01); B60T 7/06 (2013.01); B60T 7/085 (2013.01)

(58) Field of Classification Search
CPC ............. B60T 7/042; B60T 7/06; B60T 7/085
See application file for complete search history.

(56) References Cited

U.S. PATENT DOCUMENTS

| | | | | |
|---|---|---|---|---|
| 4,228,865 | A | | 10/1980 | Appley |
| 4,998,983 | A | * | 3/1991 | Ruprecht .............. B60W 30/18 |
| | | | | 477/209 |

| | | | | |
|---|---|---|---|---|
| 5,282,522 | A | | 2/1994 | Grindle |
| 5,722,302 | A | * | 3/1998 | Rixon ........................ B60T 7/06 |
| | | | | 74/514 |
| 6,212,459 | B1 | * | 4/2001 | Unterforsthuber ....... B60T 7/12 |
| | | | | 701/70 |
| 6,446,992 | B2 | | 9/2002 | Sebazco |
| 6,450,587 | B1 | | 9/2002 | MacGregor |
| 7,634,345 | B2 | * | 12/2009 | Karnjate ................. B60T 7/042 |
| | | | | 303/189 |
| 7,826,952 | B2 | * | 11/2010 | Disser ................... B60T 8/1755 |
| | | | | 701/72 |
| 9,186,990 | B2 | | 11/2015 | Ayon |
| 9,896,070 | B2 | | 2/2018 | Rosenbaum |
| 2005/0057031 | A1 | | 3/2005 | Ahnafield |
| 2005/0057087 | A1 | | 3/2005 | Ahnafield |
| 2005/0274563 | A1 | | 12/2005 | Ahnafield |

(Continued)

*Primary Examiner* — Sizo B Vilakazi

(74) *Attorney, Agent, or Firm* — Egbert, McDaniel & Swartz, PLLC

(57)     ABSTRACT

A brake assist system for a vehicle has a pressure sensor adapted to be affixed to a brake pedal of the vehicle, a brake actuator connected to the brake of the vehicle, and a controller connected or interconnected to the pressure sensor and to the brake actuator. The pressure sensor measures a pressure applied by a foot of a user of the vehicle upon the brake pedal and to produce an output signal proportional to the pressure applied. The brake actuator applies a force to the brake of the vehicle. The controller converts the output signal of the pressure sensor to a signal for moving the brake actuator. The brake actuator is a servomotor. The controller is adjustable so as to change a signal from the brake actuator relative to the output signal of the pressure sensor.

15 Claims, 4 Drawing Sheets

(56) References Cited

U.S. PATENT DOCUMENTS

2009/0099745 A1* 4/2009 Karnjate ............... B60T 8/3275
                                                       303/155
2025/0018911 A1* 1/2025 Dijken ................... B60T 13/66

* cited by examiner

EFFORTLESS READJUSTABLE BRAKING SYSTEM

CROSS-REFERENCE TO RELATED APPLICATIONS

The present application claims priority of U.S. Provisional Application Ser. No. 63/515,742, filed on Jul. 10, 2023.

BACKGROUND OF THE INVENTION

The present invention relates to braking systems for vehicle. More particularly, the present invention relates to such braking systems adapted to minimize the effort required by a user of the vehicle for applying force to the brake pedal. The present invention also relates to servomotors as used for applying pressure to the brake pedal of the vehicle relative to a force applied on to the brake pedal by the user.

Recently, Federal and State governments have made major strides to allow disabled individuals, such as paraplegics, to pursue occupations of their choice. A paraplegic may suffer paralysis of the lower half of their body involved of the movement of both legs. This prevents their driving of the typical automobile and, thus, hinders their entrance into the workforce. Although the paraplegic may be lacking in strength of their lower half of the body, more than likely, the paraplegic develops superior upper body strength to more than compensate for their disability. It is desirable that vehicles be provided having operator control systems that make use of the paraplegic's upper body strength and do not require the use of their legs.

Furthermore, elderly or disabled persons may have limited use of their legs. This limited use of the leg function can inhibit the ability to properly apply forces to the brake pedals of the vehicle for the stopping of the vehicle. When such injured or elderly persons lack sufficient strength to properly actuate the braking system of the vehicle, it is important to provide an assist to the braking system which allows such a individual to properly operate the vehicle safely.

In certain circumstances, the vehicle may be operated by persons other than the disabled, handicapped, injured or elderly person. Under such circumstances, it is not necessary for any sort of brake assist to be utilized. Such alternative persons operating the vehicle may be unfamiliar with the braking assist system and may improperly use the braking assist system to the detriment of the operation of the vehicle. As such, a need has existed whereby the braking system of the vehicle can be utilized by both the handicapped and disabled individuals and also persons with no disabilities and full functioning legs.

Automobiles that employ control systems that do not require the use of the operator's legs to control the vehicle, such as to perform braking operations, are known. Some of these are described in U.S. Pat. Nos. 656,962, 2,471,244 and 3,117,649. The '962 patent discloses a system having a single device that is used to control the steering, acceleration and braking of the vehicle. This device is a bar handle which has limitations, especially, in the steering aspects of the automobile by present-day drivers who are used to the handling provided by a steering wheel. The '244 patent utilizes a primary steering wheel to accomplish the steering of an automobile and which coacts with the auxiliary steering wheel to assist in the braking operations of the automobile. However, the operator's usage of two devices to control one automobile may disadvantageously cause the operator to lose the "feel" of the operating characteristics of the automobile. The '649 patent discloses an automobile that as a single handle to control the principal operations of an automobile which are the steering, acceleration and braking. However, the usage of a single handle to control an automobile has limitations to one who is accustomed to steering an automobile through the use of a steering wheel. It is desired that a control system be provided for an automobile that does not require the use of the legs of the operator to accommodate the braking operation, but does not suffer from prior art limitations.

In addition to the desires of the handicapped individuals, a non-handicapped person may also desire a control system that does not require the use of their legs, especially, if it allows for a system that more readily controls the automobile. This enhanced control system provides continuous control by the driver with their hands always on the steering wheel.

Automotive braking systems require human force for the activation of pneumatic braking systems. In this manner, the driver applies a force on the brake pedal, which is multiplied in such a proportion that the driver perceives only 5% of the total force on the wheels. Even so, that force is important. An average braking force is approximately 150 pounds. The current standards for braking systems have not changed much in this regard. The term "full brake application" refers to the force required to brake a vehicle in a moment of emergency. This is approximately 150 pounds. However, when one considers the human capacity to generate a suitable braking force to meet this requirement, there is a significant difference between the abilities of various persons to apply this force.

Approximately 95% of the population is able to apply force on a brake pedal of 150 pounds in order to avoid an accident. However, there is a remaining 5% of the population, including the disabled and elderly, having physical abilities that prevent them from reaching these forces and stopping a moving vehicle in the required distances.

Under many circumstances, operators of vehicles continually apply a braking force to the brake pedal of a vehicle throughout the day and over long periods of time. The application of such forces over a long period of time can produce a great deal of fatigue for such operators of vehicles. These vehicles can be in the nature of taxis, farm machinery and equipment, mass transit vehicles, and commercial trucks. Under these circumstances, it is desirable for the operator of such vehicles to minimize the force required for each application of force to the brake pedal of the vehicle.

FIG. 1 shows a prior art brake system. The prior art brake system includes a brake pedal 10 that has an arm 12 extending rearwardly therefrom. A human foot 14 is illustrated as providing a force 16 onto the brake pedal 10. The arm 12 is connected to a vacuum power brake booster 18. The vacuum power brake booster enhances the force applied to the brake pedal to the force required for the braking of the vehicle. Ultimately, the vacuum power brake booster 18 will transmit fluid flow to a brake master cylinder 20 so as to provide proper brake fluid pressure 22. Brake fluid pressure flows through tube 24 to caliper 26. Caliper 26 has brake pads 28 thereon. Brake pads 28 act on a piston 30 for the braking of the disc rotor 32. The braking of the disc rotor 32 ultimately produces a braking of the wheel 34.

With reference to FIG. 1, a large of relatively large amount of pressure is required so as to actuate the brake pedal 10 for the purposes of braking the wheel 34 of the vehicle. Various redesigns of the structure of the braking system can be contemplated, but these require a general overhaul of the entire braking system. Any overhaul of the entire braking system would make the braking system available for use by those handicapped or elderly individuals, but would not allow the use of the vehicle by those that do not require such assist.

In the past, various other patents have issued with respect to such braking assist systems for vehicles. For example, U.S. Pat. No. 4,228,865, issued Oct. 21, 1980 and R. J. Appley, describes a vehicle control system for the handicapped. The vehicle utilizes a dual-function hand-operated control system including a lever affixed to a rotatable shaft, a pair of spaced arms extending generally upwardly from the shaft forward of the lever in which one of the arms is pivotally connected to a substantially vertical push rod which extends downwardly into a substantially vertical sleeve. The lower end of the sleeve is operatively connected to a power brake booster through pivotally connecting linkage. The second arm is operatively connected to a throttle cable extending from the dashboard through a flexible connector.

U.S. Pat. No. 5,282,522, issued on Feb. 1, 1994 to G. R. Grindle, teaches a multi-purpose speed control apparatus for an automobile which enables handicapped persons to operate a vehicle with hand-applied power and without foot operation of the pedals. A mounting bracket has a supporting structure which connects with a pair of upstanding tabs, a rotatable shaft serving as a pivot point supported by stubs, and a pivotally-mounted lever connected to the shaft. The lever operates a bell crank mechanism. One side of the bell crank mechanism connects with a cable which is connected at the opposite end to the accelerator, carburetor or points inbetween to speed up the engine speed. An opposite end of the equipment connects with a flexible drive cable in a sheath wherein the cable and the sheath extend from the installed apparatus under the vehicle and connect with the brake pedal hanger mechanism. This enables a handicapped user to apply the vehicle brakes.

U.S. Pat. No. 6,446,992, issued on Sep. 10, 2002 to R. Sebazco, shows a steering and braking control system for a vehicle. This system includes a steering member that not only allows the operator to accomplish the steering of a vehicle, but also allows the operator to merely exert a force on the steering member to control the braking mechanism of a vehicle. The steering member, acting as a unitary device for controlling two of the principal operations of the vehicle, provides the operator with improved handling capabilities and does so without the operator needing to use their feet. This makes the control system of the vehicle particularly suited for handicapped individuals.

U.S. Pat. No. 6,450,587, issued on Sep. 17, 2002 to McGregor et al., provides a safety-enhancing automatic brake control system that automatically applies and maintains the brakes in an applied state when one or more conditions exist at various stations around or in the vehicle. The controller electrically connects various sensors at the vehicle stations, validates the signals, and then actuates a mechanism that engages the air, brake, fluid, mechanical brake linkage/cable or other mechanism that applies the brakes. In a hydraulic brake system, a piston or spring powers a secondary piston rod and piston and a master cylinder to apply the brakes.

U.S. Pat. No. 9,186,990, issued Nov. 17, 2015 to Ayon et al., provides a system for a manually-controlled operating system for permitting a handicapped person to brake and accelerate an automobile with hand-operated controls. The system comprises a brake handle operably connected to a foot brake pedal with a first cable and an accelerator handle operably connected to a foot accelerator pedal with a second cable. The brake handle and accelerator handler are positioned within hand reach of the handicapped person while positioned within the automobile.

U.S. Pat. No. 9,896,070, issued on Feb. 20, 2018 the R. W. Rosenbaum, shows a brake-by-wire vehicle braking system that is augmented with squeeze sensors placed at the steering wheel of the vehicle so as to enable a vehicle operator to stop the vehicle more quickly in an emergency situation.

U.S. Patent Application Publication No. 2005/0057031, published a Mar. 17, 2005 to B. Ohnafield, teaches a joystick-operated driving system for use by a physically-impaired driver for controlling a vehicle. The system includes an actuator assembly operably coupled to the pedals and an actuator assembly coupled to the steering shaft. The actuator assemblies include electrical motors operable to depress the brake pedal and the accelerator pedal and rotate the steering shaft. A joystick controller is mounted to the vehicle and is operable in a fore-aft direction to control braking and acceleration, and can be tilted side-to-side to control vehicle steering.

U.S. Patent Application Publication No. 2005/0057087, published a Mar. 17, 2005 to B. Ahnafield, shows a foot control system for a vehicle for use by a physically-impaired driver for controlling a vehicle. This foot control system includes an actuator assembly operably connected to the accelerator and brake pedals of the vehicle. The actuator assemblies include electrical motors operable to depress the brake pedal and the accelerator pedal. A pair of foot controllers are provided that are separate from the existing vehicle pedals. The foot controllers can be manipulated by the driver to generate acceleration and braking commands which are fed to an on-board processor. This processor provides appropriate motor control commands to the processor to produce a vehicle acceleration or braking indicative of the driver's command.

U.S. Patent Application Publication No. 2005/0274563, published on Dec. 15, 2005 to B. Ahnafield, teaches a system for use by physically-impaired driver for controlling a vehicle which includes an actuator assembly operably coupled to the pedals. The actuator assembly includes a pair of electrical motors operable in a rack-and-linkage arrangement to depress the brake pedal, and a third electric motor operable through a rack-and-linkage arrangement to depress the accelerator pedal. The actuator assembly is pivotally mounted above the pedals to pivot when the brake pedal is depressed. A joystick controller is mounted to the steering wheel of the vehicle and is operable in a predetermined direction to control braking and acceleration, while allowing vehicle steering to be accomplished with the existing steering wheel.

It is an object of the present invention to provide a servo-assist braking system that reduces the effort required for the braking of a vehicle.

It is another object of the present invention to provide a servo-assist braking system that allows handicapped, injured, elderly, or disabled persons to effectively operate the braking system of the vehicle.

It is another object of the present invention to provide a servo-assisted braking system wherein the travel of the brake and the travel of the handle proportional to one another.

It is a further object of the present invention to provide a servo-assist braking system which gives feedback to the operator of the vehicle.

It is another object of the present invention to provide a servo-assist braking system which allows non-handicapped individuals to operate the vehicle in a conventional matter manner.

It is still another object of the present invention to provide a servo-assist braking system which can be easily retrofit to existing vehicles.

It is still another object of the present invention to provide a servo-assist braking system which is easy-to-use and relatively inexpensive.

It is still further object of the present invention to provide a servo-assist braking system which complies with state and federal laws regarding vehicle safety.

It is still a further object of the present invention to provide a braking system that allows the brake sensitivity to be adjusted.

It is another object of the present invention to provide a braking system that can be easily reprogrammed to the particular driver needs.

It is still another object of the present invention to provide a braking system that facilitates braking by those that operate vehicles in stop-and-go traffic over a long period of time.

It is still a further object of the present invention to provide a braking system that is helpful for applying proper braking forces by truck drivers, farmers and operators of utility vehicles.

These and other objects and advantages of the present invention will become apparent from a reading of the attached specification and appended claims.

SUMMARY OF THE INVENTION

The present invention is a brake assist system for a vehicle that comprises a pressure sensor adapted to be affixed to a brake pedal of the vehicle, a brake actuator connected to the brake of the vehicle, and a controller connected or interconnected to the pressure sensor and to the brake actuator. The pressure sensor measures a pressure applied by foot of the user upon the brake pedal and to produce an output signal proportional to the pressure that is applied. The brake actuator applies a force to the brake of the vehicle. The controller converts the output signal of the pressure sensor to a signal for moving the brake actuator.

In the present invention, the pressure sensor is, preferably, a load cell. The pressure sensor is electrically connected to the controller. The pressure sensor is adapted to transmit the output signal when the pressure applied to the brake pedal is greater than a threshold value.

In the preferred embodiment of the present invention, the brake actuator is a servomotor. The brake actuator has a cylinder and a rod extending from the cylinder. The rod is affixed to a pivot point on the brake pedal. The cylinder is connected to a pivot point on a chassis or fixed structure of the vehicle. The pivot point can be on an arm of the brake extending rearwardly of the brake pedal.

The controller is adjustable so as to change a signal to the brake actuator relative to the output signal of the pressure sensor. This adjustability allows for adaptation to the needs of the person operating the vehicle. A motor driver is connected with the brake actuator. The motor driver converts a signal from the controller to a signal for operation of the brake actuator. A battery is connected to the motor driver so as to supply power to the motor driver and to the brake actuator.

In an alternative embodiment of the present invention, a hand control has a bar with one and affixed to the pressure sensor on the brake pedal. The bar of the hand control has an opposite end positioned adjacent a steering wheel of the vehicle. The hand control has an arm pivotally mounted in the vehicle. The opposite end of the bar of the hand control is pivotally connected to the arm. A movement of the arm causes the bar of the hand control to apply pressure to the pressure sensor on the brake pad.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
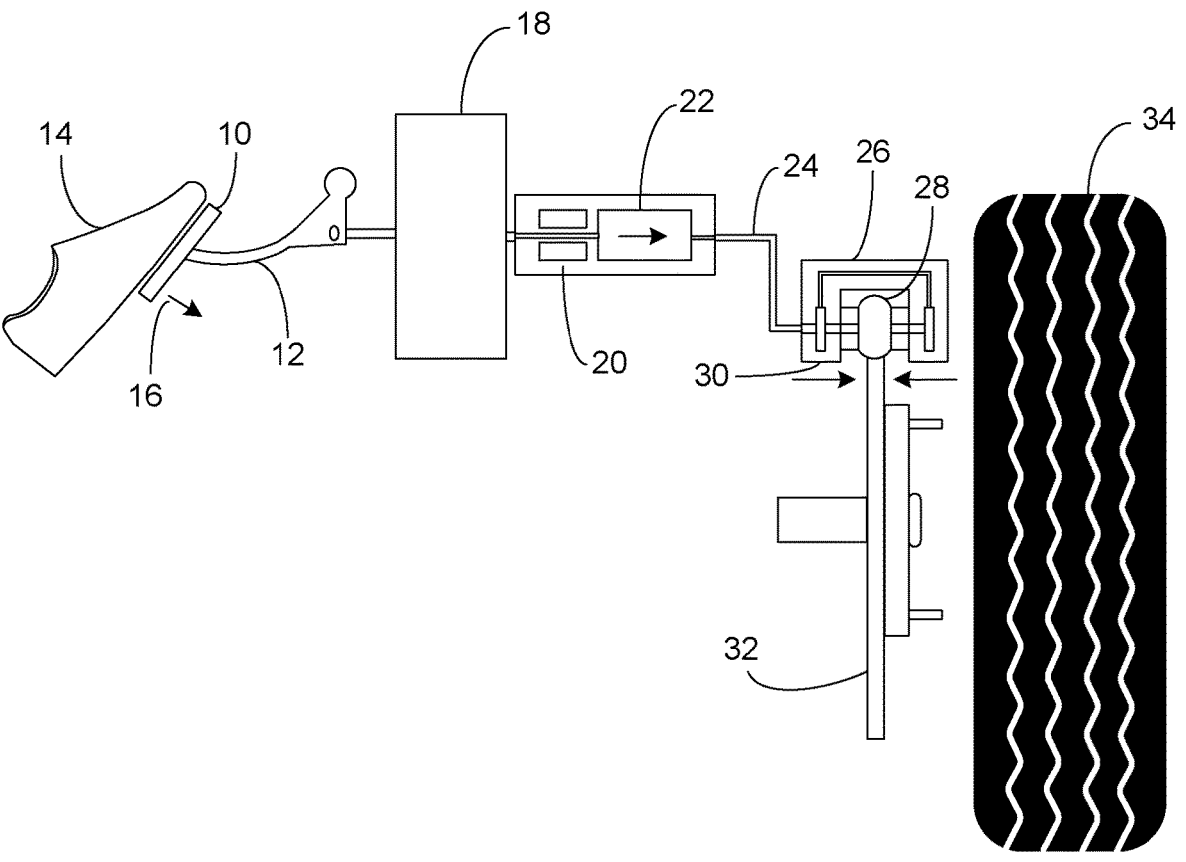
FIG. 1 is a diagrammatic illustration of a prior art braking system.
Figure 2:
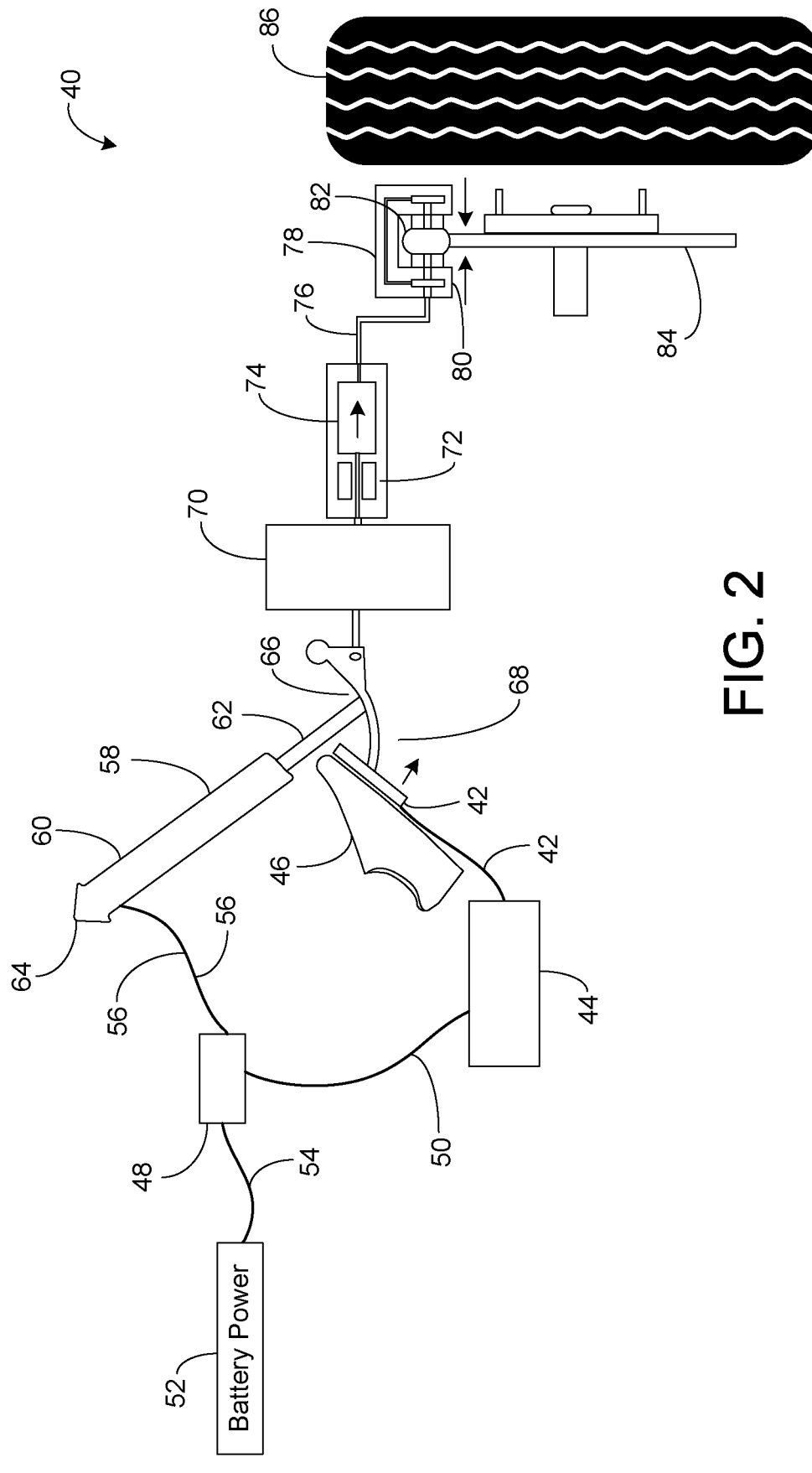
FIG. 2 is a diagrammatic illustration of the braking system in accordance with the teachings of the preferred embodiment of the present invention.

FIG. 2 shows the braking system 40 in accordance with the preferred embodiment of the present invention. The braking system 40 is illustrated as having a brake pedal 42. The brake pedal 42 has a pressure sensor 44 mounted thereon. Brake pedal 42 is adapted to allow the foot 46 of a user to apply pressure onto the pressure sensor 44. Generally, as diagrammatically illustrated in FIG. 2, the pressure sensor will reside on the outer surface of the brake pedal 42. A motor driver 48 is connected by line 50 to the pressure sensor 44. Battery 52 is connected by line 54 so as to supply power to motor driver 48. Motor driver 48 is connected by line 56 to the electric brake actuator 58. The electric brake actuator 58 includes a cylinder 60 and a rod 62.

As can be seen in FIG. 2, the cylinder 60 of the electric brake actuator 58 can be pivotally mounted at 64 to a chassis of the vehicle or other fixed structure of the vehicle. The end 66 of the rod 62 is pivotally connected to an arm 68 extending rearwardly of the brake pedal 42. This configuration facilitates the ability to utilize the braking system 40 of the vehicle in a conventional manner in those circumstances where braking assist is not required. Ultimately, as in the previous embodiment, the braking system 40 includes a vacuum power brake booster 70 that is connected to the arm 68 extending from the brake pedal 42. The vacuum power brake booster 70 is cooperative with the brake master cylinder 72. Brake master cylinder 72 includes fluid 74 on an interior thereof. This fluid 74 can flow through tube 76 to the calipers 78. In particular, the brake fluid will act on piston 80 of the calipers 78 so as to engage with the brake pad 82 of the disc rotor 84. As such, the brake assist system 40 operates to brake the wheel 86 of the vehicle.

In the present invention, the pressure sensor 44 is adapted to be affixed to an outer surface of the brake pedal 42 of the vehicle. The pressure sensor 44 measures pressure applied by the foot of the user upon the brake pedal and to produce an output signal proportional to the pressure applied. The brake actuator 58 is connected to the brake 42 and, in particular, to the arm 68 extending rearwardly of the brake pedal 42. The brake actuator 58 serves to apply a force to the brake pedal of the vehicle. The controller 48 is connected or interconnected to the pressure sensor 44 and to the brake actuator 58. The controller 48 converts the output signal of the pressure sensor 44 to a signal for moving the brake actuator and, in particular, for moving the rod 62 outwardly or inwardly relative to the piston 60.

In the preferred embodiment of the present invention, the pressure sensor 44 is a load cell. The pressure sensor is electrically connected by line 50 to the controller 44. The pressure sensor 44 is adapted to transmit the output signal when the pressure applied to the brake pedal is greater than a threshold value.

In the preferred embodiment of the present invention, the brake actuator is a servomotor.

In the present invention, the controller 48 is adjustable so as to change a signal to the brake actuator relative to the output signal of the pressure sensor 44. The controller 48 includes a motor/driver that is connected to the brake actuator. The motor/driver converts a signal from the controller to a signal for operation of the brake actuator. The battery 52 is connected to the motor driver of the controller 48 so as to apply power to the controller 48 and to the brake actuator 58. The controller 48 can include a potentiometer so as to allow the motor/driver to adapt to the needs of the individual operating the vehicle.

By incorporating the braking system 40 into a vehicle, the force applied by the driver is reduced from 150 pounds to as little as four pounds of force or less. The major components of the system include the pressure sensor 44 formed by a load cell, an electric brake actuator which is a servomotor connected between the brake pedal 42 and the chassis of the vehicle through a pair of pivot points 64 and 66, a motor/driver which is an electronic system that receives a reference signal and generates a directly proportional actuation signal on the electric brake actuator 58, and an electronic control system which interprets the pressure sensed on the sensor 44 and converts them into electric signals that, through a closed-loop control system, generates a signal that moves the electric brake actuator in the required direction.

Figure 3:
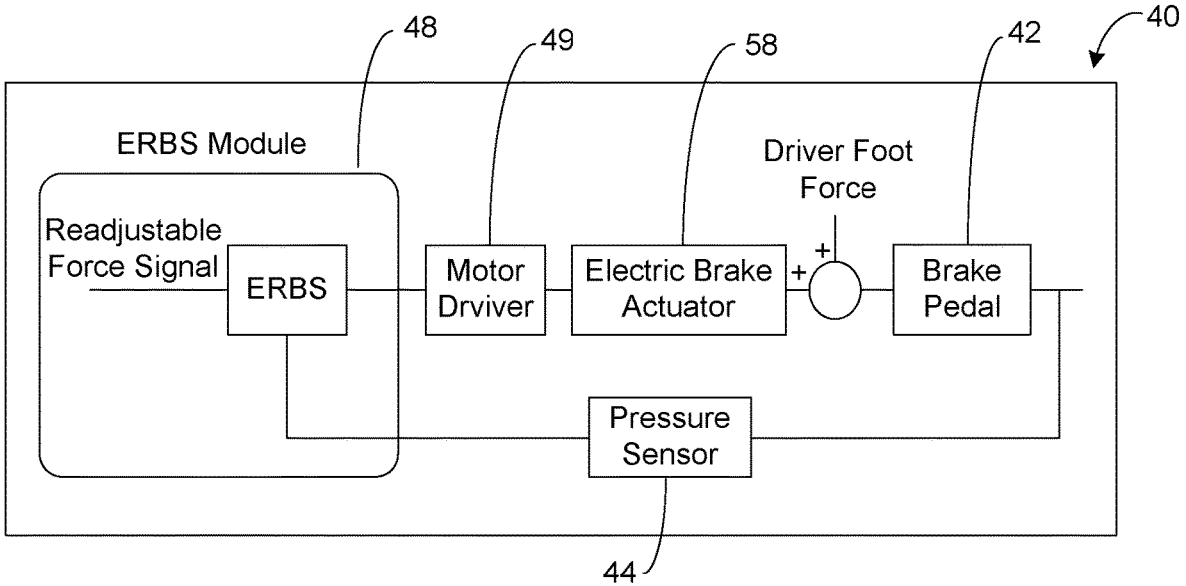
FIG. 3 is a block diagram showing the braking system of the present invention.

FIG. 3 is a block diagram showing the operation of the braking system 40 of the present invention. In particular, the pressure sensor 44 is installed on the brake pedal 42. The pressure sensor 44 determines the pressure per unit area or force exerted by the driver's foot on the brake pedal 42. This force is measured, processed, electronically amplified and compared with the minimum actuation force preprogrammed into the control system 48. If this force exceeds the threshold, then a signal is generated (i.e., a reference signal) that is sent to the motor/driver 49. The motor/driver 49 generates a current signal through a power cable that moves the motor on the electric brake actuator 58 in the same direction that the force on the pedal was applied. This decompresses the force sensor and reduces the sensor signal to the point of stopping the movement of this actuator thus closing the control loop.

Figure 4:
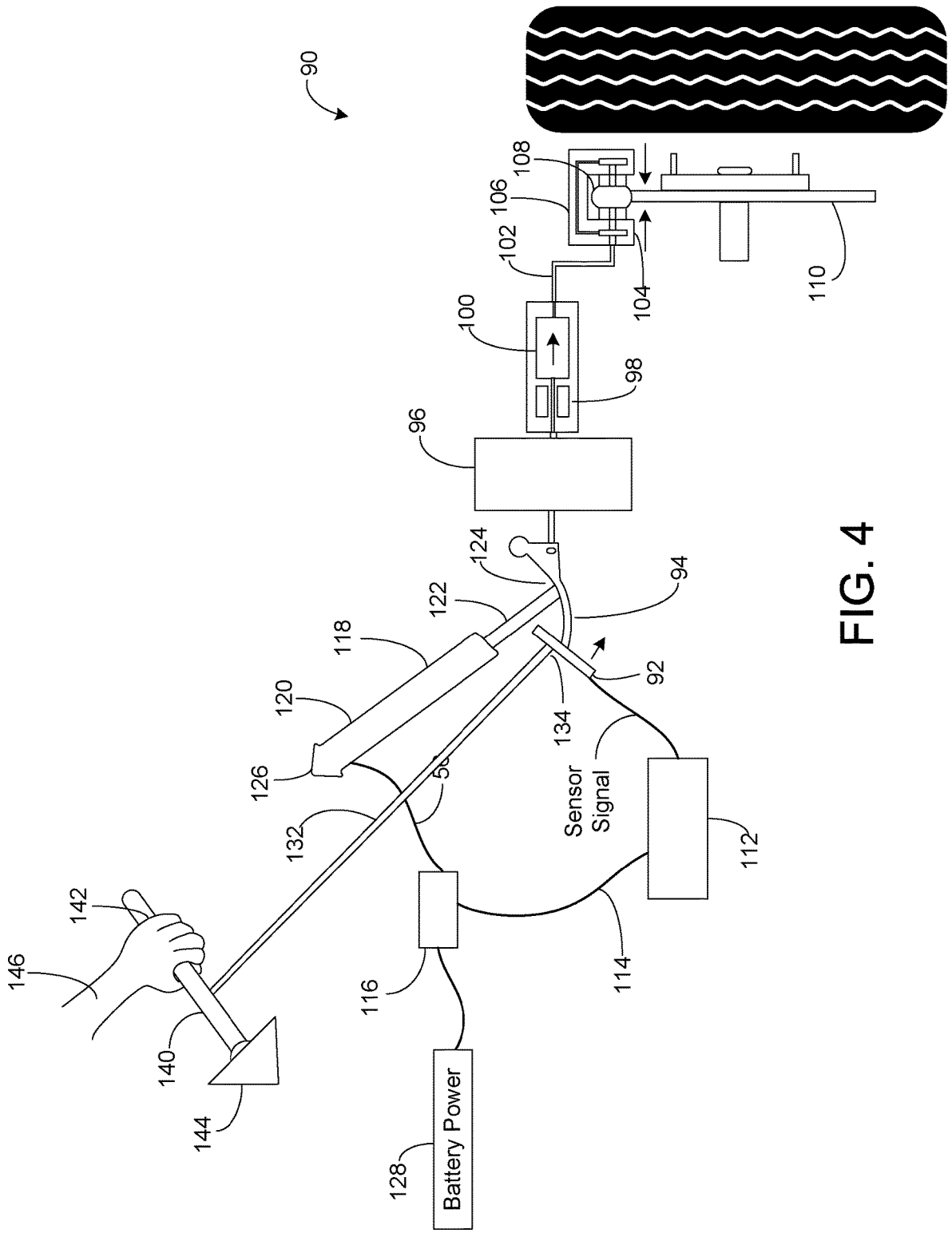
FIG. 4 is a diagram showing an alternative embodiment of the braking system of the present invention.

FIG. 4 shows an alternative embodiment of the braking system 90 of the present invention. Braking system 90 includes a brake pedal 92 having an arm 94 extending rearwardly thereof to a vacuum power brake booster 96. Brake booster 96 acts on the brake master cylinder 98 and on the brake fluid 100 within the brake master cylinder 98. The brake fluid 100 can flow through tube 102 so as to provide a suitable actuation force to the piston 104 associated with calipers 106 acting on brake pad 108 and on the disc rotor 110. These features are shown in the previous embodiment of the present invention.

Additionally, in FIG. 4, it can be seen that the pressure sensor 112 is mounted on the outer surface of the brake pedal 92. A line 114 extends to controller and motor/driver 116. Motor/driver 116 is connected to the brake actuator 118. Brake actuator 118 has a cylinder 120 with a rod 122 extending outwardly therefrom. Rod 122 has an end pivotally mounted to pivot 124 on the arm 94 extending rearwardly of the brake pedal 92. The opposite end of the cylinder 120 has a pivot point 126 that can be pivotally mounted to a fixed structure on the vehicle. Power to the controller and motor/driver 116 can be provided by battery 128.

Importantly, in the embodiment of the present invention illustrated in FIG. 4, there is a hand control 130 that can be utilized so that persons can apply pressure to the pressure sensor 112 located on the outer surface of the brake pedal 92. The hand control 130 has a bar 132 that has an end 134 bearing against the pressure sensor 112 on the outer surface of the brake pedal 92. The bar 132 has an opposite end 140 positioned adjacent to a steering wheel of the vehicle.

The hand control 130 has an arm 142 that is pivotally connected at 144 in the vehicle. The arm 142 can be manipulated by users's hand 146 within the vehicle. The end 140 of the bar 132 is pivotally connected to the arm 142. A movement of the arm 142 causes the bar 132 of the hand control 130 to apply pressure to the pressure sensor 112 on the brake pad 92. As such, the present invention is particularly adapted to allow those users that have little or no use of their legs or feet to properly control the braking action of the vehicle.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

The invention claimed is:

1. A brake assist system for a vehicle, the brake assist system comprising:
   a pressure sensor adapted to be affixed to a brake pedal of the vehicle, said pressure sensor for measuring a pressure applied by a foot of a user upon the brake pedal and to produce an output signal proportional to the measured pressure;
   a brake actuator connected to the brake of the vehicle, said brake actuator for applying a force to the brake of the vehicle, said brake actuator having a cylinder and a rod extending from the cylinder, one of the cylinder and the rod being pivotally affixed to the brake pedal, another of the cylinder and the rod adapted to be pivotally mounted to a fixed structure of the vehicle away from the pedal, the piston being translatable relative to the cylinder so as to move the brake pedal in relation to the output signal of said pressure sensor; and
   a controller connected or interconnected to said pressure sensor and to said brake actuator, said controller converting the output signal of said pressure sensor to a signal for moving said brake actuator.

2. The brake assist system of claim 1, said pressure sensor being a load cell.

3. The brake assist system of claim 1, said pressure sensor been electrically connected to said controller.

4. The brake assist system of claim 1, said pressure sensor adapted to transmit the output signal with the pressure when the pressure applied to the brake pedal is greater than a threshold value.

5. The brake assist system of claim 1, said brake actuator being a servomotor.

6. The brake assist system of claim 1, the pivot point being on an arm of the brake extending rearwardly of the brake pedal.

7. The brake assist system of claim 1, said controller being adjustable so as to change a signal to the brake actuator relative to the output signal of the pressure sensor.

8. The brake assist system of claim 1, further comprising:
a motor/driver connected to said brake actuator, said motor/driver converting a signal from said controller to a signal for operation of said brake actuator.

9. The brake assist system of claim 8, further comprising:
a battery connected to said motor/driver so as to supply power to said motor/driver and to said brake actuator.

10. A brake assist system for a vehicle, the brake assist system comprising:
a pressure sensor adapted to be affixed to a brake pedal of the vehicle, said pressure sensor for measuring a pressure applied upon the brake pedal and to produce an output signal proportional to the measured pressure;
a brake actuator connected to the brake of the vehicle, said brake actuator for applying a force to the brake of the vehicle, said brake actuator having a cylinder and a rod extending from the cylinder, one of the cylinder and the rod being pivotally affixed to the brake pedal, another of the cylinder and the rod adapted to be pivotally mounted to a fixed structure of the vehicle away from the pedal, the piston being translatable relative to the cylinder so as to move the brake pedal in relation to the output signal of said pressure sensor;
a controller connected or interconnected to said pressure sensor and to said brake actuator, said controller converting the output signal of said pressure sensor to a signal for moving said brake actuator; and
a hand control having a bar with one end affixed to said pressure sensor on said brake pedal, the bar of said hand control having an opposite end adjacent a steering wheel of the vehicle, said hand control having an arm pivotally mounted in the vehicle, the opposite end of the bar of said hand control being pivotally connected to the arm, wherein a movement of the arm causes the bar of said hand control to apply pressure to the pressure sensor on the brake pad.

11. A braking system comprising:
a vehicle having a brake pedal in an interior thereof, the brake pedal having an arm extending rearwardly of the brake pedal, the brake pedal being connected to a brake system of the vehicle so as to apply a braking force to a wheel or to a brake disc of the vehicle in relation to a pressure applied to the brake pedal;
a pressure sensor affixed to the brake pedal of said vehicle, said pressure sensor for measuring the pressure applied to the brake pedal by a foot of a user and to produce an output signal proportional to the pressure measured;
a brake actuator connected to the brake system of said vehicle, said brake actuator for applying a force to the brake pedal of said vehicle, said brake actuator having a cylinder and a rod extending from the cylinder, one of the rod and the cylinder being pivotally affixed to the arm extending rearwardly of the brake pedal, another of the rod and the cylinder being pivotally mounted to a chassis or a fixed structure of said vehicle; and
a controller connected or interconnected to said pressure sensor and to said brake actuator, said controller converting the output signal of said pressure sensor to a signal for moving said brake actuator in relation to the output signal of said pressure sensor.

12. The braking system of claim 11, said pressure sensor adapted to transmit the output signal when the pressure applied to the brake pedal is greater than a threshold value.

13. The braking system of claim 11, said brake actuator being a servomotor.

14. The braking system of claim 11, said controller being adjustable so as to change a signal to the brake actuator relative to the output signal of the pressure sensor.

15. The braking system of claim 11, further comprising:
a motor/driver connected to said brake actuator, said motor/driver converting the signal from said controller to a signal for operation of said brake actuator.

* * * * *